US012664367B2

(12) United States Patent
Levy

(10) Patent No.: US 12,664,367 B2
(45) Date of Patent: Jun. 23, 2026

(54) TRAINING A TOKENIZER USING ALTERED TEXT DATA

(71) Applicant: PayPal, Inc., San Jose, CA (US)

(72) Inventor: Ofek Levy, Tel Aviv (IL)

(73) Assignee: PayPal, Inc., San Jose, CA (US)

( * ) Notice: Subject to any disclaimer, the term of this patent is extended or adjusted under 35 U.S.C. 154(b) by 109 days.

(21) Appl. No.: 18/464,422

(22) Filed: Sep. 11, 2023

(65) Prior Publication Data

US 2025/0086393 A1     Mar. 13, 2025

(51) Int. Cl.
*G06F 40/284* (2020.01)
*G06F 40/279* (2020.01)
*G06N 3/08* (2023.01)

(52) U.S. Cl.
CPC .................................. *G06F 40/284* (2020.01)

(58) Field of Classification Search
CPC .... G06F 40/279; G06F 40/284; G06F 40/289; G06F 40/295; G06F 40/30; G06N 3/08; G06N 3/0895
USPC .......................................... 704/1, 9; 706/12
See application file for complete search history.

(56) References Cited

U.S. PATENT DOCUMENTS

| 9,348,809 B1 * | 5/2016 | Zhao | G06F 40/284 |
| 10,796,104 B1 * | 10/2020 | Lee | G06F 40/284 |
| 12,242,807 B2 * | 3/2025 | Alonichau | G06F 40/284 |
| 2016/0099967 A1 * | 4/2016 | Stemm | G06F 16/951 |
| | | | 726/1 |

| 2016/0125872 A1 * | 5/2016 | Golipour | G10L 13/10 |
| | | | 704/260 |
| 2019/0005019 A1 * | 1/2019 | Burke | G06F 40/30 |
| 2019/0272318 A1 * | 9/2019 | Suzuki | G06F 40/284 |
| 2020/0258498 A1 * | 8/2020 | Reisswig | G06F 40/30 |
| 2021/0004539 A1 * | 1/2021 | Lee | G06F 40/284 |
| 2021/0264109 A1 * | 8/2021 | Srinivasan | G06F 40/253 |
| 2022/0139384 A1 * | 5/2022 | Wu | G06F 40/30 |
| | | | 704/257 |
| 2022/0253472 A1 * | 8/2022 | Oberoi | G06F 40/253 |

(Continued)

OTHER PUBLICATIONS

Jia Guo et al., "LAMP: Label Augmented Multimodal Pretraining," arXiv:2012.04446v1 [cs.MM] Dec. 8, 2020; 9 pages.

(Continued)

*Primary Examiner* — Martin Lerner
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed for altering tokenizer training data causing a tokenizer to generate an improved library of tokens from the altered training data for tokenizing new source data during training of a machine learning model e.g., for natural language processing. A system retrieves, from a source database, a set of original text data that includes characters. The server system identifies a plurality of strings included in the set of original text data. The system alters strings included in the original text data to generate altered text data by selecting current characters included in the strings to be altered. The system trains, using the altered text data, a tokenizer by assigning a threshold to the tokenizer and inputting the altered text data into the tokenizer, where the tokenizer generates tokens for strings in the altered text data based on the threshold. The system stores the trained tokenizer.

19 Claims, 9 Drawing Sheets

(56) References Cited

U.S. PATENT DOCUMENTS

| | | | | |
|---|---|---|---|---|
| 2022/0253502 | A1* | 8/2022 | Alonichau | G06F 40/30 |
| 2022/0253691 | A1* | 8/2022 | Rokka Chhetri | G06N 3/084 |
| 2022/0269863 | A1* | 8/2022 | Araki | G06F 40/30 |
| 2022/0294757 | A1* | 9/2022 | Khasanova | G06N 3/088 |
| 2022/0405490 | A1* | 12/2022 | Krause | G06F 40/253 |
| 2023/0124402 | A1* | 4/2023 | Song | G06F 40/284 |
| | | | | 704/9 |
| 2024/0273126 | A1* | 8/2024 | Bhathena | G06F 16/3346 |
| 2024/0320429 | A1* | 9/2024 | Antognini | G06F 40/30 |
| 2025/0036667 | A1* | 1/2025 | Lim | G06F 40/295 |

OTHER PUBLICATIONS

Sabrina J. Mielke et al., "Between words and characters: A Brief History of Open-Vocabulary Modeling and Tokenization in NLP," arXiv:2112.10508v1 [cs.CL] Dec. 20, 2021; 27 pages.

Connor Shorten et al., "Text Data Augmentation for Deep Learning," Journal of Big Data, (2021) 8:101; https://doi.org/10.1186/s40537-021-00492-0; 34 pages.

Naziya Hussain et al., "Secure and Sustain Network for IoT Fog Servers," Proceedings of Third International Conference on Sustainable Computing; 2021; DOI: 10.1007/978-981-16-4538-9_30; pp. 297-306 and 509-520.

Steven Y. Feng et al., "A Survey of Data Augmentation Approaches for NLP," arXiv:2105.03075v5 [cs.CL] Dec. 1, 2021; 21 pages.

* cited by examiner

*Training Module*
*130*

*Set of Original*
*Text Data 152*

*Identified String(s)*
*134*

Alteration Module *140*

Augmentation Procedures *142*

Character Replacement Procedure 202

Character Switching Procedure 204

Character Addition Procedure 206

Space Addition Procedure 208

Character Reordering Procedure 210

String Cutoff Procedure 212

String Collapse Procedure 214

*Set of Altered*
*Text Data 144*

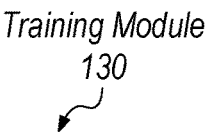
*Training Module*
*130*
*Set of Altered Text*
*Data 144*
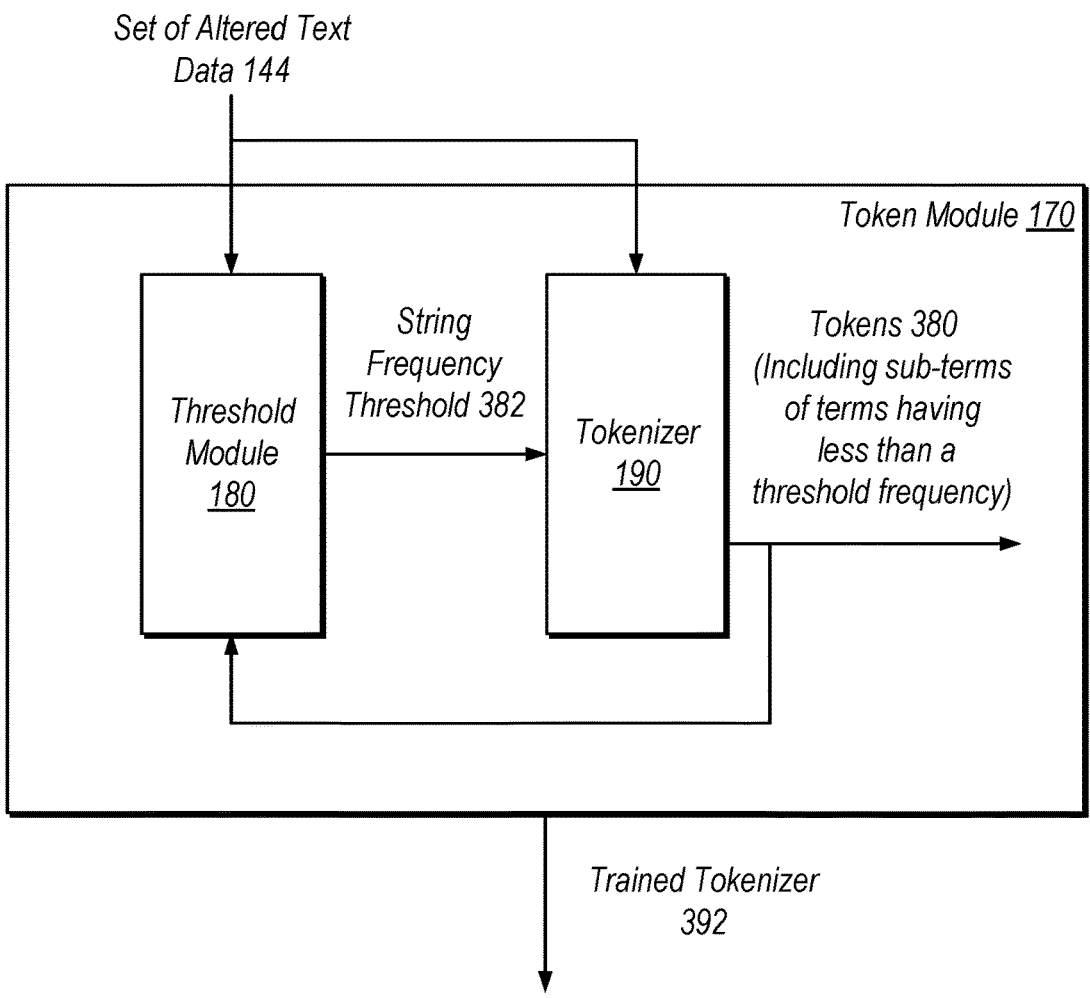
Token Module *170*
Threshold
Module
*180*
String
Frequency
Threshold 382
Tokenizer
*190*
Tokens 380
(Including sub-terms
of terms having
less than a
threshold frequency)
Trained Tokenizer
392
*Fig. 3*

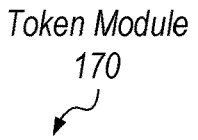

*Token Module*
*170*

*Original Set of Source*
*Data 452*

*Tokens 492A*
*(for Original Set 452)*

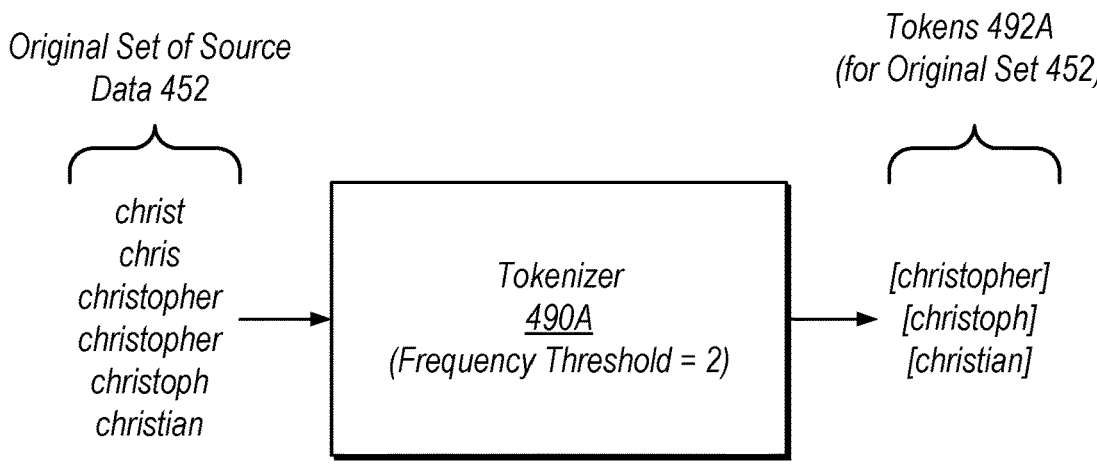

christ
chris
christopher
christopher
christoph
christian

*Tokenizer*
*490A*
*(Frequency Threshold = 2)*

[christopher]
[christoph]
[christian]

*Augmented Set of Source*
*Data 454*

*Tokens 492B*
*(for Augmented Set 454)*

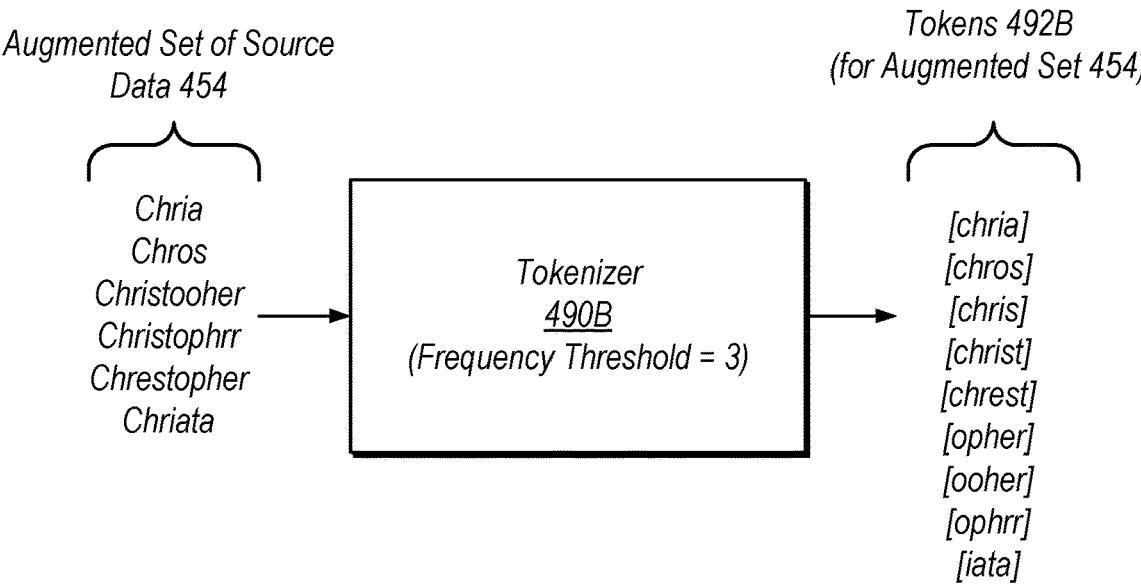

Chria
Chros
Christooher
Christophrr
Chrestopher
Chriata

*Tokenizer*
*490B*
*(Frequency Threshold = 3)*

[chria]
[chros]
[chris]
[christ]
[chrest]
[opher]
[ooher]
[ophrr]
[iata]

*Fig. 4A*

*Token Module*
*170*

*Training Tokens 494A*
*(For Training a ML Model)*

*New Set of*
*Source Data*
*462*

Chris
Christopher

Trained Tokenizer
*495A*

[chris]
[christopher]

*Training Tokens 494B*
*(For Training a ML Model)*

Trained Tokenizer
*495B*

[chris]
[christ]
[opher]

*Server System*
*120*

Training Module *130*

Set of Altered Text
Data 144

Token Module
*170*

Trained
Tokenizer(s)
122

Machine Learning Module *510*

Set of
Original
Text Data
552

Trained
Tokenizer
*122*

Tokens
524

Machine
Learning
Model
*530*

NLP
Prediction
532

Feedback
Module
*512*

Feedback
514

Trained Machine
Learning Model(s)
534

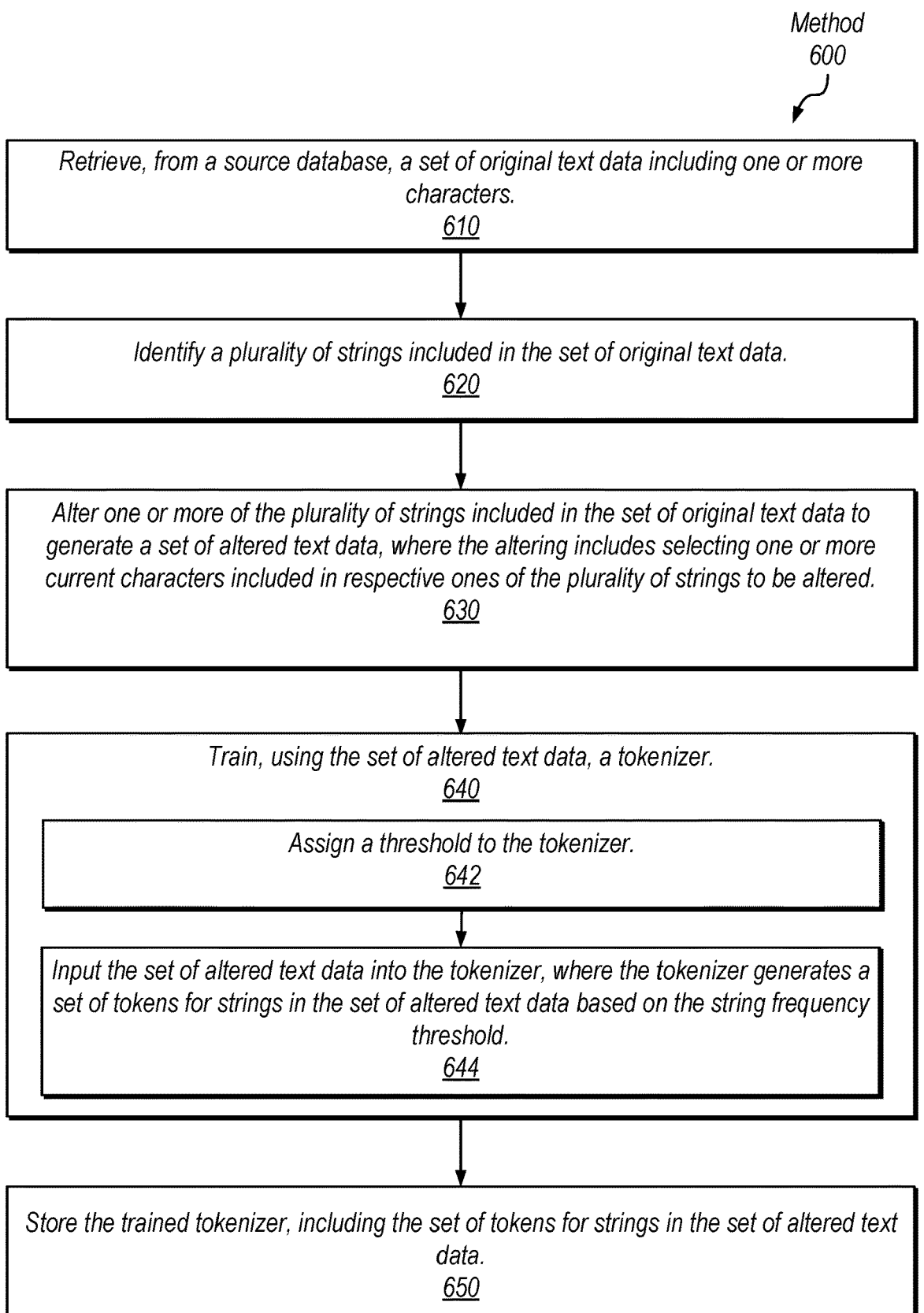

*Method*
*600*

Retrieve, from a source database, a set of original text data including one or more characters.
610

Identify a plurality of strings included in the set of original text data.
620

Alter one or more of the plurality of strings included in the set of original text data to generate a set of altered text data, where the altering includes selecting one or more current characters included in respective ones of the plurality of strings to be altered.
630

Train, using the set of altered text data, a tokenizer.
640

Assign a threshold to the tokenizer.
642

Input the set of altered text data into the tokenizer, where the tokenizer generates a set of tokens for strings in the set of altered text data based on the string frequency threshold.
644

Store the trained tokenizer, including the set of tokens for strings in the set of altered text data.
650

*Fig. 6*

TRAINING A TOKENIZER USING ALTERED TEXT DATA

BACKGROUND

Technical Field

This disclosure relates generally to altering text data, and, more specifically, to techniques for training tokenizers using altered text data, for example, for use in machine learning training.

Description of the Related Art

As more and more systems begin using machine learning to process big data, the data available to train machine learning models often becomes more and more complex. In many situations, the machine learning models are trained for a variety of different applications, such as security, analysis, risk detection, diagnostics, classification, pattern recognition, natural language processing, etc. In order to train on different types of data, different types of features (e.g., tokens) may be generated prior to training machine learning models. Often, for natural language processing applications, machine learning models are trained on text data that has been tokenized by a trained tokenizer. However, in some situations, the training of machine learning models using text data may suffer from only a small amount of text data being available for training, an imbalance in the frequency of certain terms (e.g., "the" is a very common and, thus, high frequency term), etc., often resulting in uneven tokenizers (e.g., the tokenizer fails to break down long words into smaller, common sub-words), which in turn may impact the training of machine learning models on the broken-down (tokenized) words. This may result in trained machine learning models that have difficulty identifying relationships between e.g., words and sentences, resulting in inaccurate classifications of text data during natural language processing.

BRIEF DESCRIPTION OF THE DRAWINGS

FIG. 3 is a block diagram illustrating an example token module, according to some embodiments.

FIGS. 4A and 4B are block diagrams illustrating example training and execution of trained tokenizers, respectively, according to some embodiments.

FIG. 6 is a flow diagram illustrating a method for training a tokenizer using a set of altered text data, according to some embodiments.

DETAILED DESCRIPTION

Figure 1:
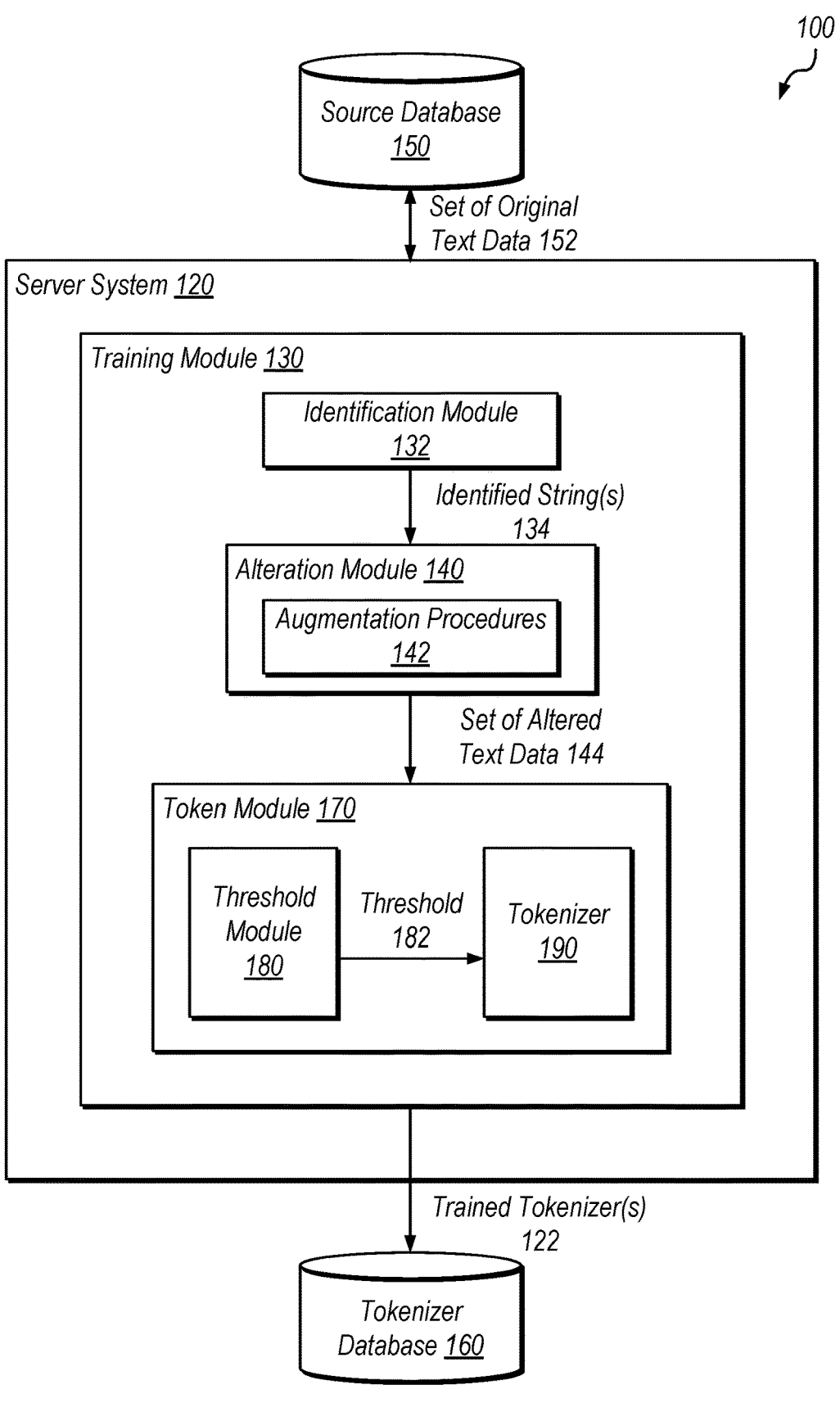
FIG. 1 is a block diagram illustrating an example server system configured to train a tokenizer using altered text data, according to some embodiments.

Techniques are disclosed for performing natural language processing (NLP) on text data using machine learning models trained using tokens generated from the text data by tokenizers trained using altered text data. In disclosed techniques, a set of text data is altered (e.g., augmented to add, remove, alter, etc. one or more characters) and used to train a tokenizer to break down terms included in the text data into sub-terms called "tokens." In disclosed techniques, these tokens are utilized to train a machine learning model to identify relationships between words, for example.

Traditionally, tokenizers attempt to break down e.g., words into their more commonly occurring portions (e.g., sub-words). As one specific example, the word "tokenization" might be broken down into the sub-words "token" and "ization" by a tokenizer in order use the tokens to train a machine learning model. These sub-words generated by a tokenizer may be referred to as tokens. Traditionally trained tokenizers, however, often miss tokenizing certain terms because these terms occur often, for example when terms (referred to as words or phrases) can occur within a set of text data at a high frequency. For example, traditional tokenizers do not break down high frequency words. Attempted solutions to this problem include down-sampling of a given set of text data. Such techniques, however, often introduce an additional problem in that certain words in a given set of text data are under-sampled, which often results in such words being over-tokenized (i.e., a word being broken down into its individual characters instead of being broken down into sub-words which are generally not as valuable for training a model to perform natural language processing). For example, if the names "John" and "Johnny" are included in a set of text data and a traditional tokenization process down samples this dataset into only the term "Johnny," this might cause a tokenizer to break the term Johnny down into its individual characters: "i," "o," "h," "n," "n," and "y." since this term only has one occurrence in the dataset. Characters are often less helpful as tokens than words or sub-words when training a model to understand the relationship between words, sub-words, sentences, etc.

To address these shortcomings, the disclosed techniques augment text data prior to using the text data to train a tokenizer. For example, the augmentation of text data performed in disclosed techniques without the need to down-sample source text data during tokenizer training teaches the tokenizer to break terms up into their smaller sub-terms without breaking the terms down more than a desirable amount (e.g., breaking words down into their individual characters). Augmentation of text data prior to tokenizer training introduces "real-world" noise causing common (high-frequency) words to be less common while still maintaining the natural form of the words, which is conducive to tokenization. Such text augmentation may advantageously result in a more meaningful library of tokens (e.g., dictionary of words or sub-words) generated by a tokenizer. For example, text data augmentation is performed using one or more augmentation procedures, including replacing, switching, adding, removing, etc. characters, spaces, symbols, etc. from strings in a set of original text data as discussed in further detail below with reference to FIGS. 2A and 2B. In disclosed techniques, a tokenizer is trained on augmented text data, but once the tokenizer is satisfactorily trained on the augmented data, the original text data is fed into the trained tokenizer in order to generate tokens for training a machine learning model to perform natural language processing, for example.

In some situations, the disclosed techniques may improve natural language processing models. For example, the disclosed techniques may advantageously prevent a tokenizer from ignoring high-occurrence (i.e., common) words when breaking down strings into their individual parts to generate tokens for input to an NLP model. The disclosed text data augmentation for tokenizer training may also prevent the need for down-sampling of source text data, which results in improved training of a machine learning models. Improved training, in turn, results in more accurate natural language processing (for any of various types of processing scenarios involving natural language processing). In addition, the disclosed techniques may advantageously reduce the need for a large training set, by providing synthetic augmented data that follows a similar distribution as the original data from which it is generated (the data prior to augmentation). Moreover, the disclosed techniques are tokenizer-agnostic in the sense that they can be applied before tokenization during natural language processing. An additional advantage of the disclosed techniques, which avoid the need to down-sample the original data, is that the processing time of the data during natural language processing is reduced relative to traditional techniques. For example, by augmenting the existing training set, the disclosed techniques avoid the need for costly preprocessing which may include counting unique occurrences of different terms within an original set of text data.

Example Tokenization System

FIG. 1 is a block diagram illustrating an example server system configured to train a tokenizer using altered text data. In the illustrated embodiment, system 100 includes source database 150, tokenizer database 160, and server system 120, which in turn includes training module 130. Training module 130, in the illustrated embodiment, includes identification module 132, alteration module 140, and token module 170.

Server system 120, in the illustrated embodiment, retrieves a set 152 of original source data from source database 150. In some embodiments, server system 120 retrieves the set 152 of original text data based on one or more of: identifying the need for a trained tokenizer, identifying that a tokenizer needs updating (needs additional training), receiving a request from another system for a trained machine learning model, etc. Source database 150 may be implemented as either a relational or non-relational database that stores any of various types of text data. For example, the set 152 of original source data retrieved by server system 120 includes various characters, which may make up words or sentences. In some situations, the set 152 of original source data includes one or more of special characters, numbers, or symbols.

After retrieving the set 152 of original text data from source database 150, server system 120 executes training module 130 to generate one or more trained tokenizers 122. In the illustrated embodiment, training module 130 executes identification module 132 to identify one or more strings 134. For example, the one or more identified strings 134 are characters, terms, words, phrases, combinations of characters, symbols, or numbers, etc. As one example, a string 134 identified by identification module 132 is an email address, such as "JohnDoe5@gmail.com," which includes characters, a number, and a symbol. An additional string 134 identified by identification module 132 might be a name, such as "John Doe," which includes only characters. Identification module 132, in the illustrated embodiment, transmits one or more identified strings 134 to alteration module 140.

Alteration module 140, in the illustrated embodiment, executes one or more augmentation procedures 142 on one or more of the identified strings 134 to generates a set 144 of altered text data. Augmentation procedures may also be referred to herein as "alteration procedures." As discussed in further detail below with reference to FIGS. 2A and 2B, alteration module 140 executes at least one augmentation procedure 142 to alter or augment a string from the original set 152 of text data to produce an altered version of the string. For example, alteration module 140 may augment an identified string 134 by adding a character to the string. In some embodiments, alteration module 140 performs two or more augmentation procedures on an identified string 134. For example alteration module 140 may add a character to the end of an identified string 134 and also remove a character from the middle of the string. Alteration module 140 sends the set 144 of altered text data to token module 170.

Token module 170, in the illustrated embodiment, includes threshold module 180 and tokenizer 190. Token module 170 executes threshold module 180 to select a threshold 182 for the tokenizer 190 and provides this threshold to the tokenizer 190. In some embodiments, threshold 182 is a string frequency threshold that specifies a threshold based on which tokenizer 190 generates tokens from a set of text data. In other embodiments, threshold 182 is a library size threshold that specifies a threshold based upon which tokenizer 190 generates tokens from a set of text data. As discussed in further detail below with reference to FIGS. 4A-4B, token module 170 trains the tokenizer 190 using the set 144 of altered text data based on the threshold 182 selected by threshold module 180. Token module 170 may output one or more trained versions of tokenizer 190.

Server system 120, in the illustrated embodiment, stores the one or more trained tokenizers 122 generated by token module 170 in tokenizer database 160. For example, server system 120 may train tokenizers 122 and store the tokenizers for use by one or more other systems e.g., for natural language processing. In this example, server system 120 trains and stores a tokenizer 122 in tokenizer database 160 and another, different system retrieves the trained tokenizer 122 stored in database 160 and uses the tokenizer to generate tokens for training a machine learning model e.g., for use in natural language processing.

In this disclosure, various "modules" operable to perform designated functions are shown in the figures and described in detail (e.g., training module 130, identification module 132, alteration module 140, token module 170, machine learning model 530, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC.

Example Alteration Module

Figure 2A:
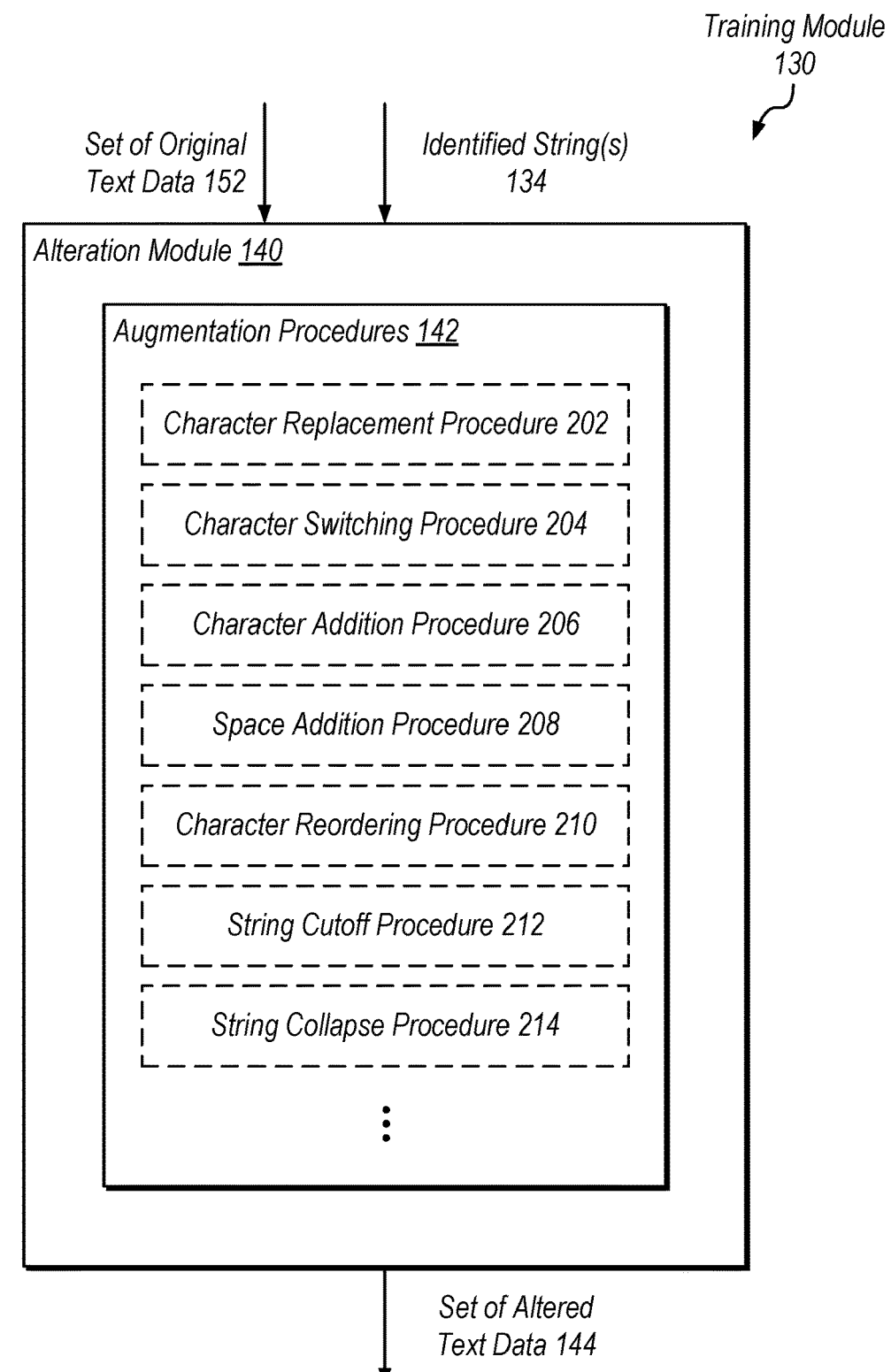
FIGS. 2A and 2B are diagrams illustrating an example alteration module and execution of example augmentation procedures, respectively, according to some embodiments.
Figure 2B:
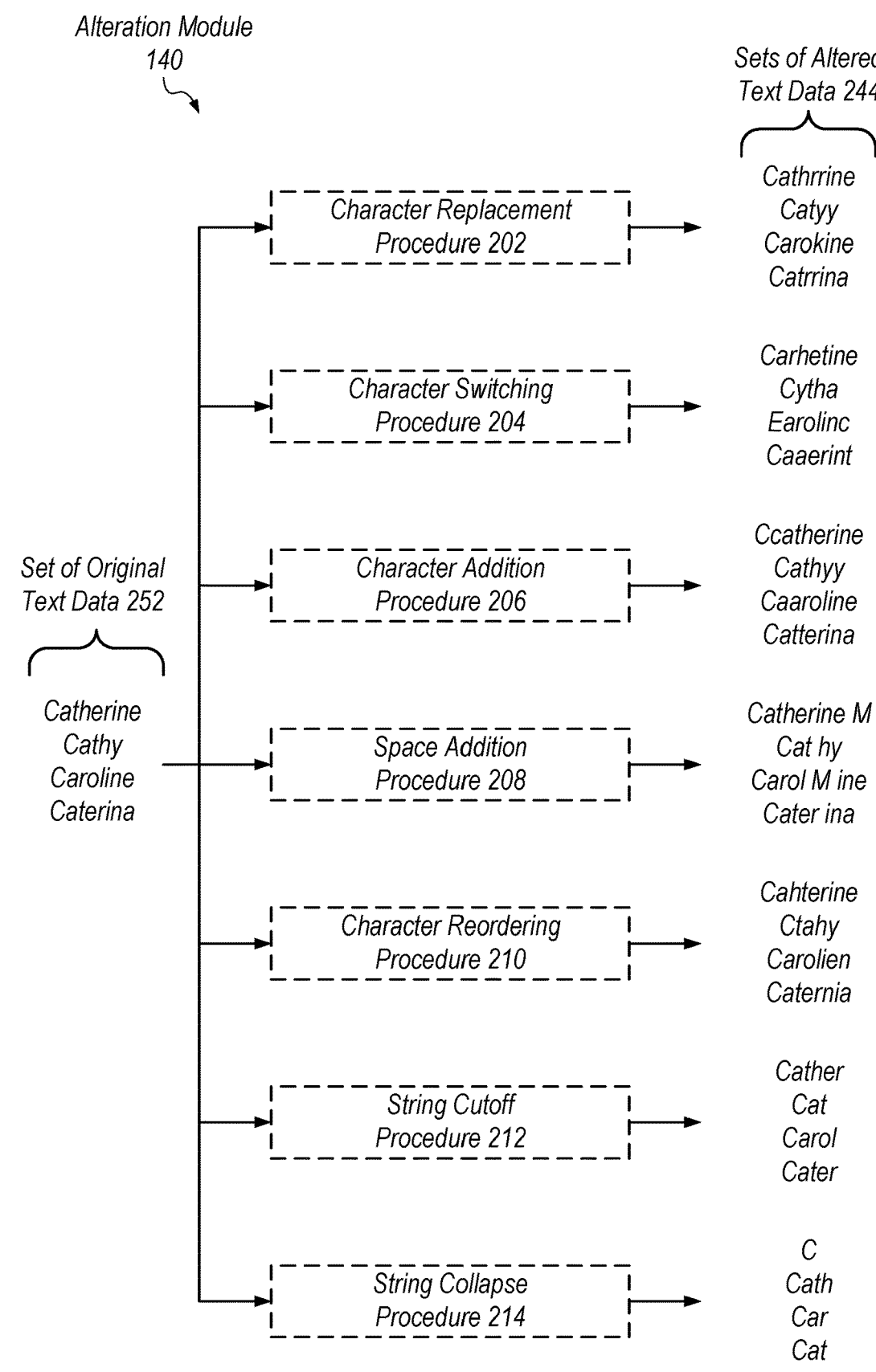

Turning now to FIGS. 2A and 2B, diagrams illustrating an example alteration module and execution of example augmentation procedures, respectively, are shown. In FIG. 2A, training module 130 includes alteration module 140, which in turn includes a plurality of augmentation procedures 142. Alteration module 140 receives a set 152 of original text data and one or more identified strings 134 and generates a set 144 of altered text data. In order to generate the set 144 of altered text data, alteration module 140 in FIG. 2A executes one or more of the following augmentation procedures 142:

a character replacement procedure 202, a character switching procedure 204, a character addition procedure 206, a space addition procedure 208, a character reordering procedure 210, a string cutoff procedure 212, a string collapse procedure 214, etc. The example list of augmentation procedures 142 shown in FIGS. 2A and 2B and discussed herein is not intended to limit the scope of the present disclosure; any of various additional or alternative augmentation procedures may be used in combination with, or instead of, the disclosed techniques. In the illustrated embodiment, alteration module 140 outputs the set 144 of altered text data. The set 144 of altered text data output by alteration module 140 may be used by token module 170 to train one or more tokenizers as discussed above in further detail below with reference to FIG. 3.

Turning now to FIG. 2B, example implementation of the plurality of augmentation procedures discussed above with reference to FIG. 2A are illustrated. For example, in FIG. 2B, alteration module 140 executes one or more of seven different augmentation procedures on a given set 252 of original text data to generate seven different sets 244 of altered text data. In some situations, alteration module 140 executes multiple augmentation procedures on the set 252 of original text data sequentially to generate a single set 244 of altered text data. For example, alteration module 140 might alter a set 252 of original text data by first performing the character replacement procedure 202 to replace one or more characters in one or more strings and then by performing a character reordering procedure 210 to reorder one or more characters in one or more of the strings that include one or more replaced characters. In various embodiments, the augmentation procedures executed by alteration module 140 attempt to mimic real-world noise for text data. For example, replacement of a character "a" in the string "apple" with the character "s" attempts to mimic the situation in which a user mistypes the word "apple" by hitting a character next to the character "a" on the keyboard instead of hitting the intended character "a." As discussed in further detail below with reference to FIGS. 4A and 4B, when text data, generated using the disclosed augmentation techniques, is used to train a tokenizer, it causes the tokenizer to break up text data (e.g., strings) into two or more subportions (e.g., smaller strings).

In FIG. 2B, alteration module 140 performs character replacement procedure 202 on set 252 of original text data, which includes the following strings: "Catherine," "Cathy," "Caroline," and "Caterina." Alteration module 140 generates a first set, of sets 244 of altered text data, by executing character replacement procedure 202. The first set of altered text data includes the following strings: "Catherine," "Catyy," "Carokine," and "Catrina." This first set is generated by replacing the character "e" in "Catherine" with the character "r," replacing the character "h" in "Cathy" with the character "y," replacing the character "l" in "Caroline" with the character "k," and replacing the character "e" in "Caterina" with the character "r." Alteration module 140 generates a second set, of sets 244 of altered text data, by executing character switching procedure 204. The second set of altered text data includes the following strings: "Carhetine," "Cytha," "Earolinc," and "Caaerint." Alteration module 140 generates the second set of altered text data by switching the characters "r" and "t" in "Catherine," switching the characters "a" and "y" in "Cathy," switching the characters "c" and "e" in "Caroline," and switching the characters "t" and "a" in "Caterina."

In FIG. 2B, alteration module 140 generates a third set, of sets 244 of altered text data, by executing character addition procedure 206. The third set of altered text data includes the following strings: "Ccatherine," "Cathyy," "Caroline," and "Catterina." Alteration module 140 generates the third set of altered text data by adding the character "c" to "Catherine," adding the character "y" to "Cathy," adding the character "a" to "Caroline," and adding the character "t" to "Caterina." Alteration module 140 further generates a fourth set, of sets 244 of altered text data, by executing space addition procedure 208. For example, in FIG. 2B, the fourth set of altered text data includes the following strings: "Catherine M," "Cat hy," "Carol M ine," and "Cater ina." Alteration module 140 generates the fourth set of altered text data by adding a space and the character "M" at the end of the string "Catherine," adding a space in the middle of the string "Cathy" between the third and fourth characters "t" and "h," adding a space and the character "M" after "Carol," and adding a space between the fifth and sixth characters "r" and "i" in the string "Caterina."

In FIG. 2B, alteration module 140 generates a fifth set, of sets 244 of altered text data, by executing character reordering procedure 210. The fifth set of altered text data includes the following strings: "Cahterine," "Ctahy," "Carolien," and "Caternia." Alteration module 140 generates the fifth set of altered text data by switching the order of characters "h" and "t," in the string "Catherine," switching the order of characters "t" and "a" in the string "Cathy," switching the order of characters "n" and "e" in the string "Caroline," and switching the order of characters "n" and "a" in "Caterina." Such augmentations may mimic typographical errors often made by users when typing these names.

Alteration module 140 further generates a sixth set, of sets 244 of altered text data, by executing string cutoff procedure 212. For example, in FIG. 2B, the sixth set of altered text data includes the following strings: "Cather," "Cat," "Carol," and "Cater." Alteration module 140 generates the sixth set of altered text data by truncating strings in the set 252 of original text data. For example, alteration module 140 truncates the string "Catherine" by removing the last three characters "ine" from the string, truncates "Cat" by removing the last two characters "ty" from the string, truncates the string "Caroline" by removing the last three characters "ine" from the string, and truncates "Caterina" by removing the last three characters "ina" from the string. Alteration module 140 generates a seventh set, of sets 244 of altered text data, by executing string collapse procedure 214. For example, the seventh set of altered text data includes the following strings: "C," "Cath," "Car," and "Cat." Alteration module 140 collapses the string "Catherine" by removing the characters after the character "C," collapses the string "Cathy" by removing the characters after "h," collapses the string "Caroline" by removing the characters after "r," and collapses the string "Caterina" by removing the characters after "t."

While example words are discussed with reference to FIGS. 2A and 2B, in other embodiments, any of various words, sentences, paragraphs, etc. may be augmented for use in training tokenizers to identify words in order to utilize the trained tokenizer to train a machine learning model to recognize relationships between various words and subwords. For example, alteration module 140 may augment a sentence including ten different words using one or more of the augmentation procedures discussed above with reference to FIGS. 2A and 2B.

Example Token Module

FIG. 3 is a block diagram illustrating an example token module. In the illustrated embodiment, training module 130 includes token module 170, which in turn includes threshold module 180 and tokenizer 190. Token module 170, in the illustrated embodiment, receives set 144 of altered text data generated by alteration module 140 as shown in FIG. 1 and generates a trained tokenizer 392 using the set 144 of altered text data.

Token module 170, in the illustrated embodiment, inputs the set 144 of altered text data into threshold module 180. Threshold module 180 determines a string frequency threshold 382 and inputs the threshold 382 to tokenizer 190. In some embodiments, threshold module 180 generates the string frequency threshold 382 based on strings included in the set 144 of altered text data. For example, threshold module 180 determines an average string occurrence frequency for the set 144 of altered text data and selects the string frequency threshold 382 based on the average string occurrence frequency (e.g., a threshold that is the same as, greater than, or equal to the average string occurrence frequency). As another example, threshold module 180 determines a highest occurring string in the set 144 of altered text data and selects the string frequency threshold 382 based on the number of occurrences of the highest occurring string (e.g., a threshold that is the same as, greater than, or equal to the average string occurrence frequency). In other embodiments, threshold module 180 generates string frequency threshold 382 based on the set 152 of original text data after receiving the set 152 of original text data and the one or more identified strings 134 from identification module 132 (shown in FIG. 1). In still other embodiments, threshold module 180 randomly selects a string frequency threshold 382 and then adjusts the threshold during training of the tokenizer 190 based on tokens 380 output by the tokenizer as discussed in further detail below.

In some embodiments, threshold module 180 selects and sends a token library threshold to tokenizer 190. For example, threshold module 180 may identify a threshold vocabulary size (e.g., the total number of tokens (terms)) that the tokenizer 190 will have (in its library) after training instead of a string frequency threshold 382. At various iterations of training, tokenizer 190 may combine strings or add commonly occurring (high frequency strings) together in order to reach a threshold vocabulary size selected and assigned by threshold module 180.

Tokenizer 190, in the illustrated embodiment, generates and outputs tokens 380 for the set 144 of altered text data based on string frequency threshold 382. Tokens 380 output by tokenizer 190 may include terms, sub-terms, characters, etc. that occur less than the string frequency threshold as discussed in further detail below with reference to FIGS. 5A and 5B. In some embodiments, tokens 380 output by tokenizer 190 are fed back to threshold module 180 and used to adjust the string frequency threshold 382 during training. The tokenizer 190 may be any of various types of heuristic models that generate tokens from strings (e.g., characters, words, sentences, paragraphs, etc.) based on a set of rules. For example, tokenizer 190 may be any of various types of tokenizers, including: WordPiece, SentencePiece, Byte-Pair Encoding (BPE), Python split function, Python natural language toolkit (NLTK), or any trainable tokenizer. Once tokenizer 190 satisfies one or more training metrics (e.g., generates a token library that includes a threshold number of tokens), token module 170 outputs a trained tokenizer module 392. For example, the trained tokenizer 392 includes a library of tokens that it generated during training. This library of tokens is utilized by the trained tokenizer 392 during execution to output tokens for a new dataset (that has not been augmented). The tokens output by the trained tokenizer 392 for the new dataset are then usable to train a machine learning model as discussed in further detail below with reference to FIG. 5.

Example of Tokenizer Training and Execution

Figure 4B:
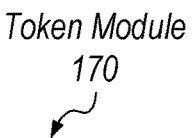

Turning now to FIGS. 4A and 4B, block diagrams are shown illustrating example training and execution of trained tokenizers, respectively. In FIG. 4A, two tokenizers 490A and 490B are shown during training by token module 170. Tokenizer 490A, in the illustrated example, has been assigned a frequency threshold of two while tokenizer 490B has been assigned a frequency threshold of three. The selection and assignment of these string frequency thresholds may be performed using the techniques discussed in detail above with reference to FIG. 3. In other embodiments, tokenizers 490A and 490B are assigned a token library threshold as discussed above with reference to FIG. 3.

In FIG. 4A, token module 170 inputs a set 452 of original source data into tokenizer 490A, which outputs a set of tokens 492A (e.g., implemented as a set of vectors) for the set 452 of original source data. For example, the set 452 of original source data includes the following strings: "christ," "chris," "christopher," "christopher," "christoph," and "christian." In the illustrated embodiment, tokenizer 490A takes the strings in set 452 of original source data and generates the following tokens 492A based on the string frequency threshold of two: "christopher," "christoph," and "christian." For example, tokenizer 490A identifies that the string "chris" occurs in all six strings in set 452 of original source data and based on the string frequency threshold of 3, tokenizer 490A does not generate a token for the string "chris." As another example, tokenizer 490A identifies that the string "christopher" occurs twice in original set 452 of source data and based on the string frequency threshold of two, tokenizer 490A generates a token for the string "christopher." As a further example, tokenizer 490A identifies that the string "christ" occurs in five of the strings in set 452 of original source data and based on the string frequency threshold of 2, does not generate a token for the string "christ." As another example, because the strings "oopher," "oph," "rist," etc. occur at least two times within set 452 of original source data, tokenizer 490A does not generate tokens for these strings.

In FIG. 4A, in contrast to the training of tokenizer 490A which includes training on an original set 452 of source data, token module 170 trains tokenizer 490B using a set 454 of augmented source data generated by alteration module 140. As discussed above with reference to FIGS. 2A and 2B, alteration module 140 executes one or more of the augmentation procedures 142 to generate the set 454 of augmented source data. For example, token module 170 inputs set 454 of augmented source data, which includes the following strings, into tokenizer 490B: "chria," "chros," "christopher," "christophrr," "chrestopher," and "chriata." Token module 170 receives this set 454 of augmented data from alteration module 140 as discussed above with reference to FIG. 1. For example, alteration module 140 may generate set 454 of augmented source data from set 452 of original source data by replacing the "st" in "christ" with "a," replacing the "i" in "chris" with "o," replacing the "p" in "christopher" with "o," replacing the "e" in "christopher" with "r," adding "er" to and replacing the "i" in "christoph" with "e," and replacing "stian" in "christian" with "ata." Tokenizer 490B, in the illustrated embodiment, outputs the following tokens for the set 454 of augmented source data based on the frequency threshold of three: "chria," "chros," "chris," "chrest,"

"opher," "ooher," "ophrr," and "iata." In other embodiments, tokenizer 490B outputs only two tokens for the set 454 of augmented source data: "chris" and "opher" based on the frequency threshold being greater than three. In various embodiments, during training of tokenizers 490, tokens are selected based on the frequency at which various sub-words appear.

In FIG. 4B, token module 170 executes trained versions of the tokenizers being trained in FIG. 4A. For example, trained tokenizer 495A, which is a trained version of token-izer 490A (shown in FIG. 4A), generates training tokens 494A from a new set 462 of source data. For example, trained tokenizer 495A receives the strings "chris" and "christopher," and generates tokens "chris" and "christo-pher." Similarly, trained tokenizer 495B, which is a trained version of tokenizer 490B (shown in FIG. 4A), generates training tokens 494B from new set 462 of source data for use in training a machine learning model as discussed in further detail below with reference to FIG. 5. In contrast to trained tokenizer 495A, trained tokenizer 495B (which was trained based on augmented source data) generates tokens 494B: "chris," "christ," and "opher." These training tokens 494B are usable to train a machine learning model in various embodiments. The tokenizer 495B which is trained on augmented data is able to break down common words into sub-words because the augmentation of the training data provides natural noise in the dataset during training. For example, the augmentation replaces many occurrences of commonly occurring words like "chris" and "christopher" with noisy version of them like "chria," "chrus," and "chris-tipher." With such augmentation, the frequency of com-monly occurring words is reduced, while the frequency of various sub-words remains the same or similar.

Example Machine Learning Using Trained Tokenizers

Figure 5:
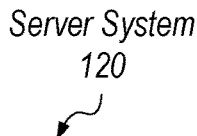
FIG. 5 is a block diagram illustrating an example machine learning module, according to some embodiments.

In FIG. 5, a block diagram is shown illustrating an example machine learning module. In the illustrated embodiment, server system 120 includes training module 130, which includes token module 170 and machine learning module 510, which in turn includes trained tokenizer 122, machine learning model 530, and feedback module 512. As discussed above with reference to FIG. 1, token module 170 receives a set 144 of altered text data and outputs one or more trained tokenizers 122. In the illustrated embodiment, token module 170 sends the one or more trained tokenizers 122 to machine learning module 510.

Machine learning module 510, in the illustrated embodi-ment, inputs a set 552 of original text data into a trained tokenizer 122 received from token module 170. Trained tokenizer 122 outputs tokens 524 based on the set 552 of original text data. For example, tokens 524 may be words, sub-words, characters, etc. as discussed in detail above with reference to FIGS. 4A and 4B. In some embodiments, the trained tokenizer 122 generates tokens 524 and then per-forms a one-hot encoding procedure to generate one-hot encoded vectors for use in training a machine learning model. For example, the one-hot encoded vectors generated by trained tokenizer 122 from a set of original text data are training inputs for machine learning model 530 in order to train the model 530 e.g., to identify words within sentences or paragraphs.

Machine learning module 510 inputs the tokens 524 into machine learning model 530 during training of the model. The machine learning model 530 outputs NLP predictions 532 for the tokens 524. For example, the NLP predictions 532 are predictions indicating whether a given string included in a token 524 is a word. In some situations, the prediction is a value between 0 and 1 indicating the certainty of the model that a given string is a particular word. For example, a prediction of 0.9 for a given string might indicate that the model is 90% certain that the given string is a word. In other embodiments, the NLP predictions 532 output by machine learning model 530 are sentence classifications or string similarity predictions. For example, the machine learning model 530 may classify a sentence as one of various different categories or of sentences. As another example, the machine learning model 530 may predict the similarity between two different strings. In this example, model 530 may output a number between 0 and 1 indicating the probability that two strings match.

Feedback module 512, in the illustrated embodiment, sends feedback 514 to machine learning model 530 based on the NLP predictions 532. For example, the feedback 514 may be one or more adjusted (or replaced) weights for machine learning model 530. For example, feedback module 512 compares the NLP predictions 532 output by machine learning model 530 during training with known labels (e.g., known identified words) to measure the learning of model 530. In this example, if the output NLP predictions 532 are similar to or the same as known labels, then feedback module 512 does not alter weights of model 530 (and the model may be considered "trained" for the time-being). In the illustrated embodiment, machine learning module 510 outputs one or more trained machine learning models 534.

Example Method

FIG. 6 is a flow diagram illustrating a method for training a tokenizer using a set of altered text data, according to some embodiments. The method 600 shown in FIG. 6 may be used in conjunction with any of the computer circuitry, systems, devices, elements, or components disclosed herein, among other devices. In various embodiments, some of the method elements shown may be performed concurrently, in a dif-ferent order than shown, or may be omitted. Additional method elements may also be performed as desired. In some embodiments, server system 120 performs the elements of method 600. In other embodiments, one or more elements of method 600 are additionally or instead performed by one or more other servers or computing devices.

At 610, in the illustrated embodiment, a server system retrieves a set of original text data including one or more characters from a source database. In some embodiments, one or more strings in the set of original text data further include one or more of: symbols, special characters, and numbers. For example, one or more strings in the set of original text data may be email addresses that include letters, numbers, an "@" symbol, and a ".com".

At 620, the server system identifies a plurality of strings included in the set of original text data. In some embodi-ments, a given string includes a set of characters. For example, a given string includes five characters. In this example, the given string might be a name, such as "Greta."

At 630, the server system alters one or more of the plurality of strings included in the set of original text data to generate a set of altered text data, where the altering includes selecting one or more current characters included in respec-tive ones of the plurality of strings to be altered. In some embodiments, the altering includes randomly selecting, from an allowed list of characters, one or more replacement characters for the randomly selected one or more current characters. In some embodiments, the altering includes replacing the one or more current characters of a given string with the selected one or more replacement characters. In some embodiments, the altering includes augmenting the given string by replacing at least one character in the given string. In some embodiments, selecting one or more current characters included in strings to be altered is performed by identifying one or more characters that are located one third of the length of the given string from the beginning of the given string. In some embodiments, altering a given string includes randomly selecting two current characters included in the given string and switching locations of the two current characters within the given string.

In some embodiments, the server system augments one or more of the plurality of strings included in the set of original text data to generate the set of altered text data. In some embodiments, the augmenting includes adding a space and a character to a given one of the identified plurality of strings. For example, the server system may add a space and an additional character at the end of an individual's name in order to mimic a first name, middle initial name format. In some embodiments, the altering includes identifying that a given string in the set of original text data includes a space and swapping a first set of characters located before the space within the given string with a second set of characters located after the space within the given string. For example, the server system might switch the order of the name "Johnny A" to be "A Johnny" instead. As another example, the server system might switch the order of "Hello World" to "World Hello." In some embodiments, altering a given string includes splitting the given string at a location of one of the current characters and deleting characters located after the location of the one of the current characters within the given string. In some embodiments, the altering further includes collapsing, based on the randomly selected one or more current characters, the one or more of the plurality of strings, wherein the collapsing includes removing the randomly selected one or more characters.

At 640, the server system trains a tokenizer using the set of altered text data. In some embodiments, the set of altered text data includes one or more altered strings and one or more original strings included in the original set of text data that have not been altered.

At 642, the server system assigns a threshold to the tokenizer. In some embodiments, assigning the threshold includes determining, based on the identified plurality of strings, an occurrence frequency of respective strings included in the set of original text data. In some embodiments, assigning the threshold includes determining, based on the determined string frequencies, an average string occurrence frequency for the set of original text data. In some embodiments, assigning the threshold includes selecting, based on the average string occurrence frequency, a string frequency threshold that is less than the average string occurrence frequency. In some embodiments, the server system assigns a token library threshold. For example, the token library threshold specifies a threshold vocabulary size to be met by the tokenizer during training. In order to meet the token library threshold during training, the tokenizer may perform multiple iterations on a set of text data to separate, generate, or combine portions of strings (e.g., words) that occur more often than others within the set of text data. In this example, the combinations of words are "tokens" generated by the tokenizer.

At 644, the server system inputs the set of altered text data into the tokenizer, where the tokenizer generates a set of tokens for strings in the set of altered text data based on the threshold. In some embodiments, during training of the tokenizer, the server system updates the threshold based on the set of tokens generated by the tokenizer. In such embodiments, after updating the threshold, the server system re-inputs the set of altered text data into the tokenizer to generate an updated set of tokens. If the updated set of tokens satisfies one or more training requirements (e.g., the set of tokens includes a desired or threshold number of tokens of a given length), then the server system does not update the threshold a second time. In some embodiments, the tokenizer generates tokens in the form of vectors for training a machine learning model.

At 650, the server system stores the trained tokenizer, including the set of tokens for strings in the set of altered text data. In some embodiments, the server system trains a machine learning model by inputting the set of original text data into the trained tokenizer. In some embodiments, the trained tokenizer compares strings in the set of original text data with the set of tokens for the set of altered text data. In some embodiments, the trained tokenizer generates a new set of tokens for the strings in the set of original text data based on comparing the strings with the set of tokens. In some embodiments, the server system inputs the new set of tokens for strings in the set of original text data into the machine learning model. In some embodiments, the server system updates one or more weights of the machine learning model based on comparing output of the machine learning model for tokens in the new set of tokens with known labels for tokens in the new set of tokens. In some embodiments, the trained machine learning model is used in natural language processing. In some embodiments, the server system performs natural language processing on a new set of text data by identifying, using the trained machine learning model, one or more terms included in unidentified strings of the new set of text data.

*Example Computing Device*

Figure 7:
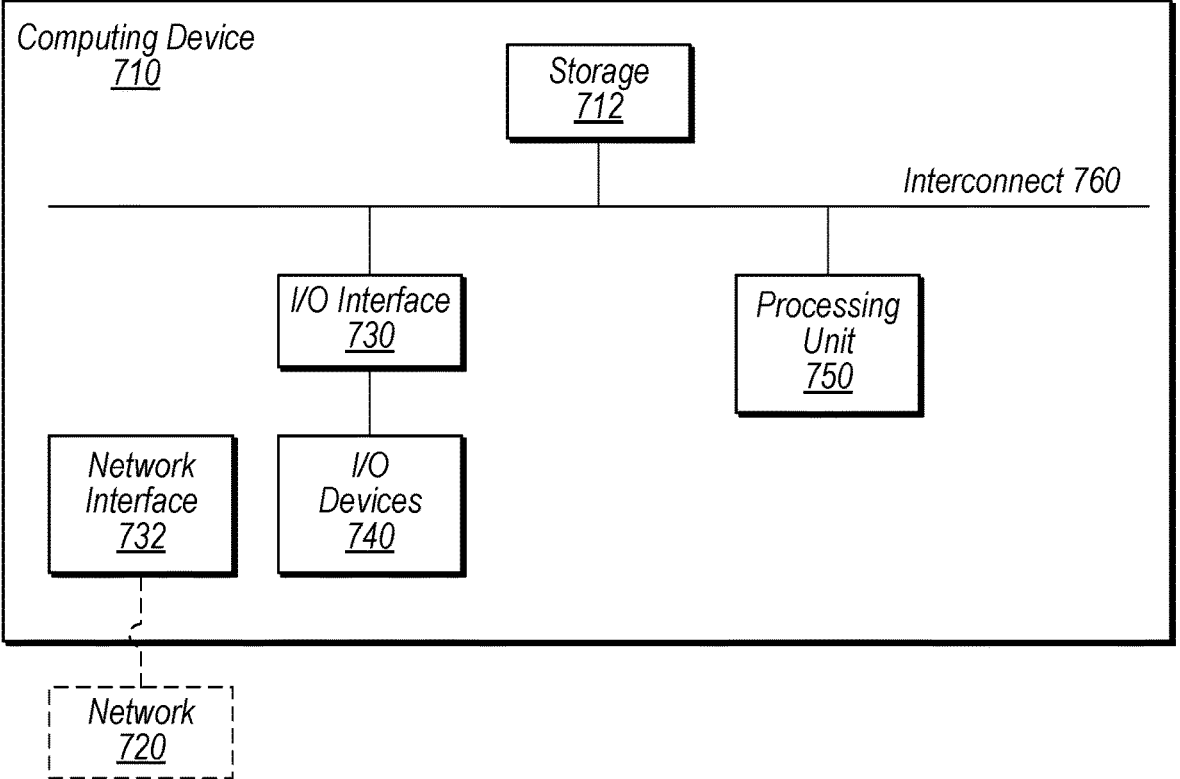
FIG. 7 is a block diagram illustrating an example computing device, according to some embodiments.

Turning now to FIG. 7, a block diagram of one embodiment of computing device 710 (which may also be referred to as a computing system) is depicted. Computing device 710 may be used to implement various portions of this disclosure. Computing device 710 may be any suitable type of device, including, but not limited to, a personal computer system, desktop computer, laptop or notebook computer, mainframe computer system, web server, workstation, or network computer. The server system 120 shown in FIG. 1 and discussed above is one example of computing device 710. As shown, computing device 710 includes processing unit 750, storage 712, and input/output (I/O) interface 730 coupled via an interconnect 760 (e.g., a system bus). I/O interface 730 may be coupled to one or more I/O devices 740. Computing device 710 further includes network interface 732, which may be coupled to network 720 for communications with, for example, other computing devices.

In various embodiments, processing unit 750 includes one or more processors. In some embodiments, processing unit 750 includes one or more coprocessor units. In some embodiments, multiple instances of processing unit 750 may be coupled to interconnect 760. Processing unit 750 (or each processor within 750) may contain a cache or other form of on-board memory. In some embodiments, processing unit 750 may be implemented as a general-purpose processing unit, and in other embodiments it may be implemented as a special purpose processing unit (e.g., an ASIC). In general, computing device 710 is not limited to any particular type of processing unit or processor subsystem.

Storage subsystem 712 is usable by processing unit 750 (e.g., to store instructions executable by and data used by processing unit 750). Storage subsystem 712 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 712 may consist solely of volatile memory, in one embodiment. Source database 150 and tokenizer database 160, discussed above with reference to FIG. 1 are examples of storage subsystem 712. Storage subsystem 712 may store program instructions executable by computing device 710 using processing unit 750, including program instructions executable to cause computing device 710 to implement the various techniques disclosed herein.

I/O interface 730 may represent one or more interfaces and may be any of various types of interfaces configured to couple to and communicate with other devices, according to various embodiments. In one embodiment, I/O interface 730 is a bridge chip from a front-side to one or more back-side buses. I/O interface 730 may be coupled to one or more I/O devices 740 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation-[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:

retrieving, by a server system from a source database, a set of original text data including one or more characters;

identifying, by the server system, a plurality of strings included in the set of original text data;

altering, by the server system, one or more of the plurality of strings included in the set of original text data to generate a set of altered text data, wherein the altering includes:

selecting one or more current characters located one third of the length of one or more strings included in the plurality of strings to be altered; and replacing the one or more current characters of the one or more strings to be altered with one or more randomly selected replacement characters;

training, by the server system using the set of altered text data, a tokenizer, wherein the training includes:

assigning a string frequency threshold to the tokenizer, including inputting the string frequency threshold into the tokenizer; and inputting the set of altered text data into the tokenizer, wherein the tokenizer generates a set of tokens for strings in the set of altered text data, and wherein a number of tokens generated by the tokenizer and included in the set of tokens is based on the string frequency threshold; and storing, by the server system, the trained tokenizer, including the set of tokens for strings in the set of altered text data.

2. The method of claim 1, further comprising:
training, by the server system, a machine learning model by:
  inputting the set of original text data into the trained tokenizer, wherein the trained tokenizer:
    compares strings in the set of original text data with the set of tokens for the set of altered text data; and
    generates, based on the comparing, a new set of tokens for the strings in the set of original text data;
  inputting the new set of tokens for strings in the set of original text data into the machine learning model; and
  updating, based on comparing output of the machine learning model for tokens in the new set of tokens with known labels for tokens in the new set of tokens, one or more weights of the machine learning model.

3. The method of claim 2, further comprising:
performing, by the server system, natural language processing on a new set of text data, including identifying, using the trained machine learning model, one or more terms included in unidentified strings of the new set of text data.

4. The method of claim 1, wherein the randomly selected replacement characters are selected:
  from an allowed list of characters including a subset of a set of available characters.

5. The method of claim 1, wherein the altering includes:
identifying that a given string in the set of original text data includes a space; and
swapping a first set of characters located before the space within the given string with a second set of characters located after the space within the given string.

6. The method of claim 1, wherein the set of altered text data includes one or more altered strings and one or more original strings included in the original set of text data that have not been altered.

7. The method of claim 1, wherein altering a given string includes:
  randomly selecting two current characters included in the given string; and
  switching locations of the two current characters within the given string.

8. The method of claim 1, wherein assigning the string frequency threshold includes:
  determining, based on the identified plurality of strings, an occurrence frequency of respective strings included in the set of original text data;
  determining, based on the determined occurrence frequencies of the respective strings, an average string occurrence frequency for the set of original text data; and
  selecting, based on the average string occurrence frequency, the string frequency threshold that is less than the average string occurrence frequency.

9. The method of claim 1, wherein one or more strings in the set of original text data further include one or more of: symbols, special characters, and numbers.

10. A non-transitory computer-readable medium having instructions stored thereon that are executable by a server system to perform operations comprising:
  retrieving, from a source database, a set of original text data including one or more characters;

identifying a plurality of strings included in the set of original text data;
altering one or more of the plurality of strings included in the set of original text data to generate a set of altered text data, wherein the altering includes selecting one or more current characters included in respective ones of the plurality of strings to be altered;
training, using the set of altered text data, a tokenizer, wherein the training includes:
  assigning a string frequency threshold to the tokenizer, including inputting the string frequency threshold into the tokenizer; and
  inputting the set of altered text data into the tokenizer, wherein the tokenizer generates a set of tokens for strings in the set of altered text data, and wherein a number of tokens generated by the tokenizer and included in the set of tokens is based on the string frequency threshold; and
training, using the trained tokenizer, a machine learning model, including:
  executing the trained tokenizer to generate a new set of tokens for strings in the set of original text data, wherein the trained tokenizer generates the new set of tokens based on comparing strings in the set of original text data with the set of tokens for the set of altered text data;
  inputting the new set of tokens for strings in the set of original text data into the machine learning model; and
  updating the machine learning model based on comparing output of the machine learning model for tokens in the new set of tokens with known labels for tokens in the new set of tokens.

11. The non-transitory computer-readable medium of claim 10, wherein the altering includes:
  identifying that a given string in the set of original text data includes a space; and
  swapping a first set of characters located before the space within the given string with a second set of characters located after the space within the given string.

12. The non-transitory computer-readable medium of claim 10, further comprising:
  performing, by the server system, natural language processing on a new set of text data, including identifying, using the trained machine learning model, one or more terms included in unidentified strings of the new set of text data.

13. The non-transitory computer-readable medium of claim 10, wherein the altering includes:
  randomly selecting, from an allowed list of characters including a subset of a set of available characters, one or more replacement characters for the selected one or more current characters; and
  replacing the one or more current characters of a given string with the randomly selected one or more replacement characters.

14. The non-transitory computer-readable medium of claim 10, wherein altering the set of text data further includes:
  augmenting one or more of the plurality of strings included in the set of original text data by adding noise to the one or more strings.

15. A system, comprising:
  a processor; and a non-transitory computer-readable medium having instructions stored thereon that are executable by the processor to cause the system to perform operations comprising:

retrieving, from a source database, a set of original text data including one or more characters;

identifying a plurality of strings included in the set of original text data;

altering one or more of the plurality of strings included in the set of original text data to generate a set of altered text data, wherein the altering includes:

selecting one or more current characters located one third of the length of one or more strings included in the plurality of strings to be altered; and replacing the one or more current characters of the one or more strings to be altered with one or more randomly selected replacement characters;

training, using the set of altered text data, a tokenizer, wherein the training includes:

assigning a string frequency threshold to the tokenizer, including inputting the string frequency threshold into the tokenizer; and inputting the set of altered text data into the tokenizer, wherein the tokenizer generates a set of tokens for strings in the set of altered text data, and wherein a number of tokens generated by the tokenizer and included in the set of tokens is based on the string frequency threshold; and storing the trained tokenizer, including the set of tokens for strings in the set of altered text data.

16. The system of claim 15, wherein the randomly selected replacement characters are selected from an allowed list of characters including a subset of a set of available characters.

17. The system of claim 15, wherein the altering further includes:

identifying that one or more of the plurality of strings include a space; and swapping a first set of characters located before the space within the one or more strings with a second set of characters located after the space within the one or more strings.

18. The system of claim 15, wherein altering a given string includes:

randomly selecting two current characters included in the given string; and switching locations of the two current characters within the given string.

19. The system of claim 15, wherein assigning the string frequency threshold includes:

determining, based on the identified plurality of strings, an occurrence frequency of respective strings included in the set of original text data;

determining, based on the determined occurrence frequencies of the respective strings, an average string occurrence frequency for the set of original text data; and selecting, based on the average string occurrence frequency, the string frequency threshold that is less than the average string occurrence frequency.

* * * * *